United States Patent
Viet et al.

(10) Patent No.: US 12,063,159 B2
(45) Date of Patent: Aug. 13, 2024

(54) MEMORY-EFFICIENT TECHNIQUE FOR WEIGHTED ROUND-ROBIN LOAD BALANCING

(71) Applicant: RED HAT, INC., Raleigh, NC (US)

(72) Inventors: Julien Viet, Marseilles (FR); Thomas Segismont, Marseilles (FR)

(73) Assignee: Red Hat, Inc., Raleigh, NC (US)

( * ) Notice: Subject to any disclaimer, the term of this patent is extended or adjusted under 35 U.S.C. 154(b) by 568 days.

(21) Appl. No.: 17/307,053

(22) Filed: May 4, 2021

(65) Prior Publication Data

US 2022/0360532 A1 Nov. 10, 2022

(51) Int. Cl.
*H04L 47/62* (2022.01)
*H04L 47/125* (2022.01)

(52) U.S. Cl.
CPC ........ *H04L 47/125* (2013.01); *H04L 47/6225* (2013.01); *H04L 47/623* (2013.01)

(58) Field of Classification Search
CPC .. G06F 16/2255; G06F 9/3836; G06F 9/5077; G06F 9/5083; G06F 16/951; G06F 16/35; G06F 16/313; G06F 16/337; G06F 16/24564; G06F 16/2379; G06F 1/03; G06N 3/08; G06N 20/00; G06N 5/01; G05B 13/0265; H04L 41/14; H04L 47/125; H04L 47/6225; H04L 47/623; H04L 67/1004–1025; H04W 16/00; H04W 16/32
See application file for complete search history.

(56) References Cited

U.S. PATENT DOCUMENTS

| | | | | |
|---|---|---|---|---|
| 5,657,476 | A * | 8/1997 | O'Connell | G10H 5/007 84/622 |
| 9,531,590 | B2 | 12/2016 | Jain et al. | |
| 2008/0313213 | A1 * | 12/2008 | Zhang | G06F 16/283 707/999 |

(Continued)

FOREIGN PATENT DOCUMENTS

CN 109981476 A 7/2019

OTHER PUBLICATIONS

Shi, Y., et al., "Balancing Distributed Key-Value Stores with Efficient In-Network Redirecting," Electronics, 2019, 8, 1008.

(Continued)

*Primary Examiner* — The Hy Nguyen
(74) *Attorney, Agent, or Firm* — Kilpatrick Townsend & Stockton LLP

(57) ABSTRACT

A memory-efficient technique for performing weighted round-robin load balancing in a distributed computing system is described. In one example of the present disclosure, a system can determine an offset to apply to a list of node identifiers based on a counter value. The system can select a subset of node identifiers from the list of node identifiers based on the offset. The system can then select a node identifier from the subset of node identifiers based on the counter value and a length of the subset of node identifiers. The system can transmit data to a node that corresponds to the node identifier and increment the counter value. The system can repeat this process any number of times to distribute data among a group of nodes in the distributed computing system.

20 Claims, 11 Drawing Sheets

(56) References Cited

U.S. PATENT DOCUMENTS

| | | | |
|---|---|---|---|
| 2014/0304798 A1* | 10/2014 | Iyengar | H04L 63/1458 |
| | | | 726/11 |
| 2015/0288680 A1* | 10/2015 | Leggette | G06F 21/6218 |
| | | | 726/6 |
| 2017/0104815 A1* | 4/2017 | Tao | H04L 67/1029 |
| 2020/0311142 A1* | 10/2020 | Edelman | G06F 16/9027 |
| 2021/0357764 A1* | 11/2021 | Frazier | G06F 16/2255 |

OTHER PUBLICATIONS

Eisenbud, D.E., et al., "Maglev: A Fast and Reliable Software Network Load Balancer," Google Inc., 2016, maglev-hsie@google.com.

* cited by examiner

MEMORY-EFFICIENT TECHNIQUE FOR WEIGHTED ROUND-ROBIN LOAD BALANCING

TECHNICAL FIELD

The present disclosure relates generally to load balancing in a distributed computing system. More specifically, but not by way of limitation, this disclosure relates to a memory-efficient technique for performing weighted round-robin load balancing in a distributed computing system.

BACKGROUND

Distributed computing systems such as cloud computing environments, computing clusters, and data grids have recently grown in popularity. A distributed computing system can include multiple nodes (e.g., physical machines or virtual machines) in communication with one another over a network, such as a local area network or the Internet.

In some cases, a distributed computing system can include a load balancer to distribute network traffic and other loads among a set of nodes. The load balancer can distribute the loads across the nodes according to a predefined algorithm, which may be designed to improve throughput and optimize (e.g., reduce) the computational burden on the individual nodes. One example of such a predefined algorithm can be a round-robin algorithm. A round-robin algorithm can involve forwarding loads to each node in the set of nodes in a circular fashion. For example, the load balancer can forward a load to each node in the set of nodes in a sequential order and, once all nodes have been forwarded a load, the load balancer can return back to the beginning of the sequence and repeat the process again. This process can be repeated for any number of iterations.

Some round-robin algorithms can be weighted such that some nodes are transmitted more loads than other nodes during an iteration of the sequence. These round-robin algorithms can be referred to as weighted round-robin algorithms. A weighted round-robin algorithm can use weights to dictate how loads are to be distributed among the nodes in the distributed computing system.

DETAILED DESCRIPTION

Figure 1:
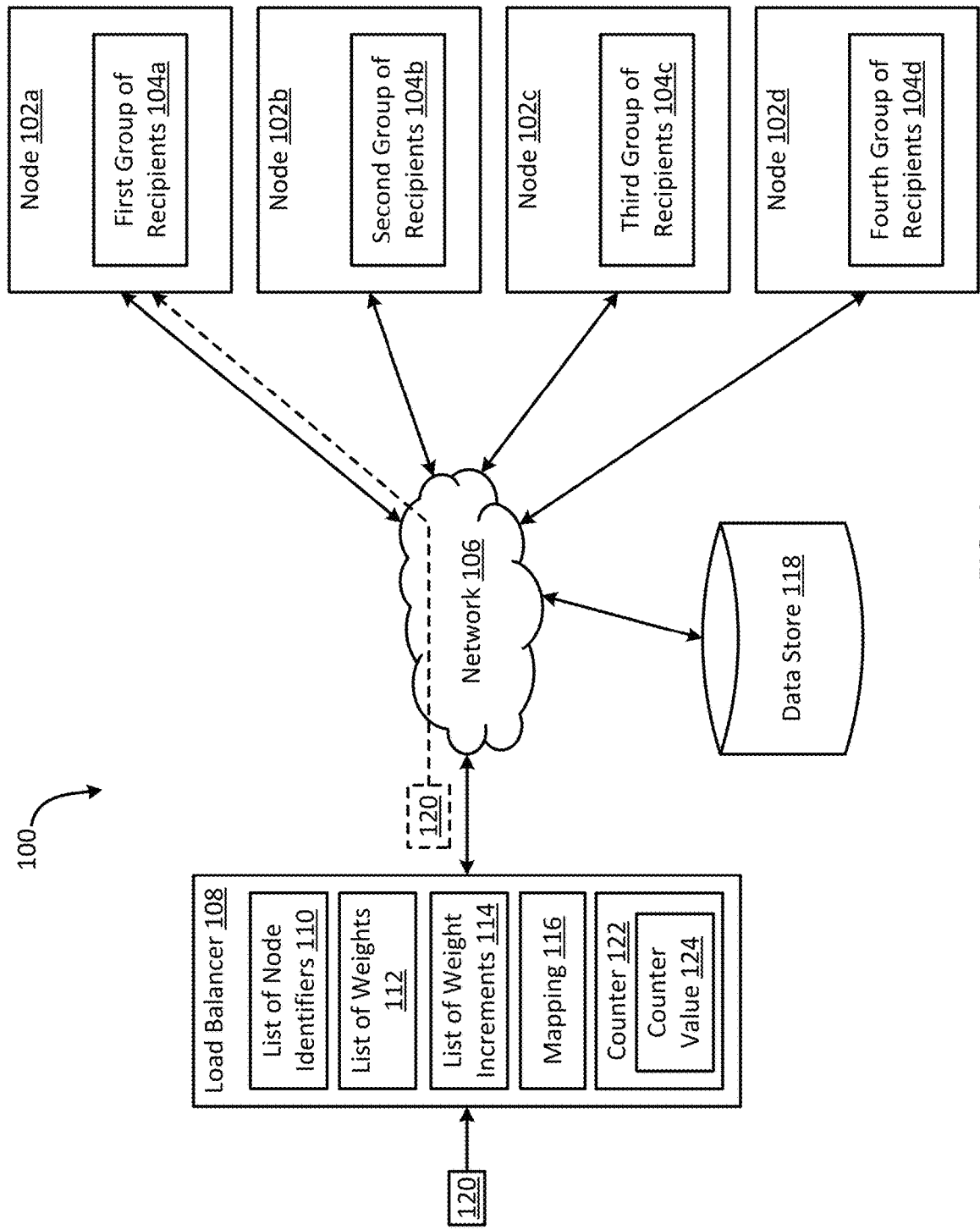
FIG. 1 shows a block diagram of an example of a distributed computing system for implementing a memory-efficient technique for round-robin load balancing according to some aspects of the present disclosure.

A distributed computing system can include a load balancer for distributing loads among nodes. The nodes can include recipients for receiving the loads from the load balancer, where a recipient is any executable software process configured to receive a load. The nodes may be heterogeneous and have different computing characteristics relative to one another, such as different amounts of computing resources (e.g., CPU, memory, storage, etc.). Due to the different computing characteristics of the nodes, the nodes may execute different numbers of recipients, which can result in the nodes being capable of handling different load amounts. To account for these differences, the load balancer may execute a weighted round-robin algorithm that uses weights to dictate how loads are to be distributed among the nodes. The load balancer can forward each node a proportion of a total load based on the node's weight.

Some weighted round-robin algorithms can involve generating an array of length T in memory, where T is the sum of the weights assigned to the nodes, and where the elements of the array are identifiers of nodes that are to receive loads in the distributed computing system. The load balancer can increment a counter from 0 to T−1, where the counter's value corresponds to an index position in the array that indicates a current node to which to transmit a load, to step through the array and thereby implement an iteration of the round-robin process. After completing an iteration of the round-robin process, the load balancer can reset the counter value to zero and repeat the process again.

As one particular example, the distributed computing system can include four nodes {A, B, C, D} that are assigned the respective weights {7, 9, 3, 4}. In this example, the length T of the array would be 7+9+3+4=23 elements long. An example of this array may be as follows:

{A, B, C, D, A, B, C, D, A, B, C, D, A, B, D, A, B, A, B, A, B, B, B}

There are seven elements in the array labeled "A" based on node A's weight of seven, nine elements labeled "B" based on node B's weight of nine, three elements labeled "C" based on node C's weight of three, and four elements labeled "D" based on node D's weight of four, for a total of 23 elements in the array. The order of the elements in the array can be chosen based on round-robin principles, for example so that loads are distributed as evenly as possible among the nodes during each iteration of the round-robin process while still respecting the nodes' weights. While this is a relatively simple example, there may be dozens or hundreds of nodes having individual weights that are relatively large, such as weight values that are in the hundreds or thousands. The length of a resulting array can consume a significant amount of memory space. Additionally, the distributed computing system may allow for the generation of multiple such arrays so that the same set of nodes or different sets of nodes can be grouped and weighted in different ways (e.g., to allow for different load-balancing strategies), which can result the consumption of even more memory space. In some cases, there may hundreds or thousands of such arrays with thousands of elements each.

Some examples of the present disclosure can overcome one or more of the abovementioned problems by providing a memory-efficient technique for performing load balancing among nodes in a distributed computing system. The memory-efficient technique can use a mapping of keys to offsets and a list of node identifiers to determine which nodes are to receive data during a load-balancing process. The mapping and the list of node identifiers are described in greater detail later on. By using the mapping and the list of node identifiers, the memory-efficient technique can conserve a significant amount of memory space as compared to other approaches that generate large arrays. In particular, the list of node identifiers may only have N elements, where N is the number of nodes among which loads are to be distributed, and the mapping may only have N−1 elements. This can result in significant memory savings. For example, the weighted round-robin algorithm described above may be applied to six nodes having weights of {1024, 1153, 897, 957, 1035} to produce a large array containing 4,109 elements that consumes 75,120 bytes of memory. In contrast, the memory-efficient technique may only consume 689 bytes of memory when applied to the same six nodes, for a memory savings of roughly 99%. This can allow for more memory to be used for processes other than load balancing, which may improve the performance of the distributed computing system.

As one specific example, a system can include a list of node identifiers that uniquely identify a set of nodes in the distributed computing system. The system can also include a mapping of keys to offsets. The keys can correspond to counter values and the offsets can correspond to index positions characterizing the locations of elements in the list of node identifiers. The offsets can be determined based on weights assigned to the nodes. The system can use the list of node identifiers and mapping as follows to implement a load-balancing process.

The system can determine a counter value (e.g., integer value). The system can select an offset in the mapping by comparing the counter value to the keys in the mapping. Based on the selected offset, the system can determine a subset of node identifiers from the list of node identifiers. The subset of node identifiers can include all of the node identifiers between two index positions in the list of node identifiers. The two index positions can include a first index position defined by the offset and a second index position, which may be the last index position in the list of node identifiers. Depending on the offset, the subset of nodes identifiers may consist of fewer than all of the node identifiers in the list of node identifiers. Having determined the subset of node identifiers, the system can next select a particular node identifier from the subset of node identifiers. The particular node identifier can be selected from the subset of node identifiers based on the current counter value and a length of the subset of node identifiers, where the length of the subset of node identifiers is the number of elements in the subset. Having selected the node identifier, the system can transmit data to a node that corresponds to the node identifier and increment the counter value.

The above process can be iterated until the counter reaches a maximum counter value, which may signify the end of a single iteration of the load-balancing process. Once an iteration of the load-balancing process is complete, the system can reset the counter value to zero and begin another iteration. The system can implement any number of iterations to distribute data (e.g., tasks, messages, network traffic, and other loads) among the nodes in the distributed computing system in a weighted round-robin fashion.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a distributed computing system 100 for implementing a memory-efficient technique for round-robin load balancing according to some aspects of the present disclosure. The distributed computing system 100 can be any suitable type of distributed computing system, such as a cloud computing environment, a computing cluster, or a data grid.

The distributed computing system 100 includes nodes 102a-d (e.g., physical machines, virtual machines, or a combination thereof) in communication with one another via one or more networks 106, such as a local area network or the Internet. The nodes 102a-d can include recipients for receiving data. A recipient can be any executable software process configured to receive data and perform one or more operations using the data. In this example, node 102a includes a first group of recipients 104a, node 102b includes a second group of recipients 104b, node 102c includes a third group of recipients 104c, and node 102d includes a fourth group of recipients 104d. The groups of recipients 104a-d can each include any number and combination of recipients. Each of the nodes 102a-d can receive data and distribute the data among its recipients to balance incoming loads among its recipients. For example, node 102a can distribute incoming data among its group of recipients 104a, node 102ab can distribute incoming data among its group of recipients 104b, node 102c can distribute incoming data among its group of recipients 104c, and node 102d can distribute incoming data among its group of recipients 104d.

The distributed computing system 100 also includes a load balancer 108 that can determine how to balance a load among the nodes 102a-d. The load balancer 108 can be a software program, a physical machine, or a combination thereof. The load balancer 108 can implement an iterative load-balancing process to distribute data among the nodes 102a-d.

To perform the load-balancing process, the load balancer 108 can obtain a list of node identifiers 110 for the nodes 102a-d, for example by retrieving the list of node identifiers 110 from memory. A node identifier can uniquely identify one node from the other nodes in the distributed computing system 100. Examples of a node identifier can be one or more letters, one or more numbers, a combination of letters and numbers, a logical address, an Internet Protocol (IP) address, etc. The list of node identifiers 110 may be input by a user or automatically generated by the load balancer 108, in some examples.

The load balancer 108 may also obtain a list of weights 112 for the nodes 102a-d. Obtaining the list of weights 112 can involve retrieving the list of weights 112 from memory or generating the list of weights 112. In some examples, the weight for a node can correspond to the number of recipients executing on the node. In one such example, the weight for node 102a can be the number of recipients (e.g., 15) that are included in the first group of recipients 104a. The weight for node 102b can be the number of recipients (e.g., 25) that are included in the second group of recipients 104b. The weight for node 102c can be the number of recipients (e.g., 25) that are included in the third group of recipients 104d. The weight for node 102d can be the number of recipients (e.g., 35) that are included in the fourth group of recipients 104d. Of course, other weighting schemes are also possible and the present disclosure is not intended to be limited to the above exemplary weighting scheme.

Any suitable method can be used to generate the list of weights 112. For example, the list of weights 112 may be manually input by a user. Additionally or alternatively, the list of weights 112 can be automatically determined by the load balancer 108. To automatically determine the list of weights 112, the load balancer 108 may transmit a query to each node for the number of recipients executing on the node. Each node can transmit a response to the load balancer 108 indicating how many recipients it is executing. The load balancer 108 can then use the responses from the nodes 102a-d to populate the list of weights 112.

After obtaining the list of weights 112, the load balancer 108 can sort the list of weights 112 (e.g., from a lowest value to a highest value) to generate a sorted list of weights. One example of a sorted list of weights 204 and corresponding node identifiers 202 is shown in table 200 of FIG. 2. In table 200, the letter "a" is a node identifier that uniquely identifies node 102a and has a corresponding weight of 15, the letter "b" is a node identifier that uniquely identifies node 102b and has a corresponding weight of 25, the letter "c" is a node identifier that uniquely identifies node 102c and has a corresponding weight of 25, and the letter "d" is a node identifier that uniquely identifies node 102d and has a corresponding weight of 35.

Figure 2:
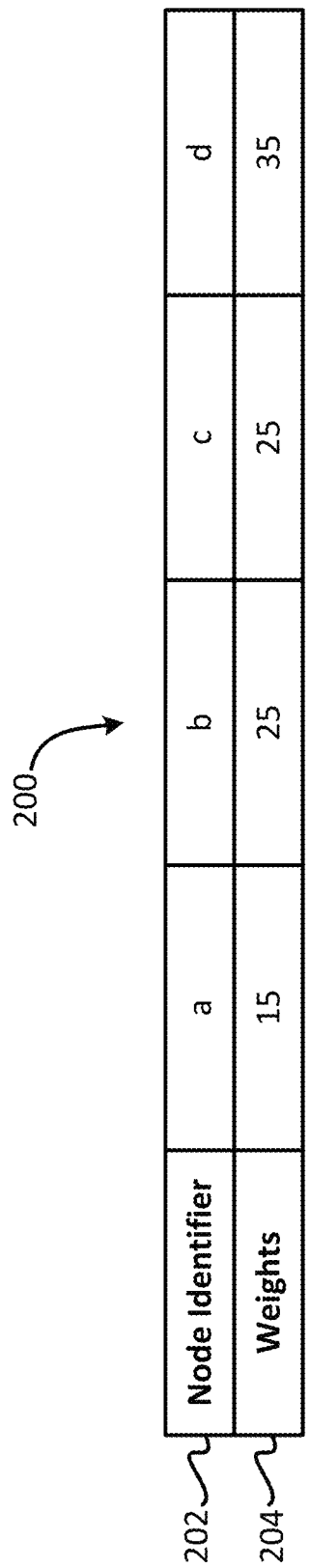
FIG. 2 shows a table including an example of a sorted list of weights for nodes according to some aspects of the present disclosure.

Each weight can represent how many round-robin cycles, during a single iteration of the load-balancing process, are to involve the corresponding node. There can be many round-robin cycles during a single iteration of the load-balancing process, where each round-robin cycle can involve sequentially transmitting loads to a set of nodes. For example, a single round-robin cycle can be {a, b, c, d}, whereby loads are sequentially transmitted to nodes 102a-d. There may be a dozen or more of such round-robin cycles during a single iteration of the load-balancing process. Referring to FIG. 2, the weight of 15 for node 102a may indicate that it should be included in a total of 15 round-robin cycles during a single iteration of the load-balancing process. The weight of 25 for nodes 102b-c may mean that they should each be included in a total of 25 round-robin cycles during the single iteration of the load-balancing process. And the weight of 35 for node 102d may mean that it should be included in a total of 35 round-robin cycles during the single iteration of the load-balancing process. Based on the weights, there can be 15 round-robin cycles in which loads are transmitted to nodes {a, b, c, d}, 25 round-robin cycles in which loads are only transmitted to nodes {b, c, d}, and 35 round-robin cycles in which loads are only transmitted to node {d}. These round-robin cycles overlap with one another, so there may be a total of 35 round-robin cycles during a single iteration of the load-balancing process. For example, because {b, c, d} is a subset of {a, b, c, d}, the 15 round-robin cycles that involve nodes 102a-d will also count towards the 25 round-robin cycles that only involve nodes 102b-d. And because {d} is a subset of {b, c, d}, the 25 round-robin cycles that include nodes 102b-d will also count towards the 35 round-robin cycles that only involve node 102d.

The load balancer 108 can use the list of weights 112 (e.g., the sorted list of weights) to generate a list of weight increments 114. A weight increment can be a difference between two weights, such as two weight values that are adjacent to one another in the list of weights 112. A process for generating the list of weight increments 114 is described in greater detail later on with respect to FIG. 11, but the process generally involves determining a respective weight increment that corresponds to each weight in the list of weights 112 and storing the weight increment in the list of weight increments 114. The load balancer 108 can determine a weight increment that corresponds to a particular weight by subtracting a reference value from the particular weight. For some weight increments, the reference value can be zero. For other weight increments, the reference value can be another weight in the list of weights 112, such as a prior weight in the list of weights 112. The other weight can have the same value as, or a different value than, the particular weight.

Figure 3:
FIG. 3 shows a table including an example of weight increments according to some aspects of the present disclosure.

One example of a list of weight increments 114 can be {15, 10, 0, 10}, as shown in the table 300 of FIG. 3. In table 300, the top row 302 corresponds to the sorted list of weights and the bottom row 304 corresponds to weight increments. The calculations for these weight increments are also shown in FIG. 3 for ease of explanation. As shown, the first weight increment can be determined by subtracting a reference value of zero from the first weight of 15, to arrive at a first weight increment of 15. The reference value is zero because there is no immediately prior weight in the list of weights (e.g., the top row 302 of table 300). The second weight increment can be determined by subtracting a reference value of 15 from the second weight of 25, to arrive at a second weight increment of 10. The reference value is 15 because it is the immediately prior weight in the list of weights. The third weight increment can be determined by subtracting a reference value of 25 from the third weight of 25, to arrive at a third weight increment of 0. The reference value is 25 because it is the immediately prior weight in the list of weights. The fourth weight increment can be determined by subtracting a reference value of 25 from the fourth weight of 35, to arrive at a third weight increment of 10. The reference value is 25 because it is the immediately prior weight in the list of weights. Thus, the weight increments can characterize the steps between weight values. Of course, other techniques may be used to calculate the weight increments and the present disclosure is not intended to be limited to this particular approach.

Using the list of weight increments 114, the load balancer 108 can determine a set of key ranges and corresponding offsets. Each <key range, offset> pair can be determined based on a weight increment in the list of weight increments 114. In particular, the load balancer 208 can determine a key range by multiplying a weight increment by a number of nodes associated with the weight increment.

For example, node 102a has a weight increment of 15 in FIG. 3. This means that there are 15 round-robin cycles that include node 102a. These round-robin cycles also include nodes 102b-d, as described above. So, the total number of nodes in the first 15 round-robin cycles is four. The load balancer 208 can multiply the weight increment by the total number of nodes to determine that a first range of keys is to span: (15 weight increment)×(4 nodes)=60 keys. This number of keys can correspond to the number of loads that will be transmitted to the four nodes 102a-d across the 15 round-robin cycles. Using an index value starting at zero, the load balancer 208 can determine that the first range of keys is to span from 0-59. The load balancer 208 can also assign an offset of zero to the first range of keys. As another example, node 102b has a weight increment of 10 in FIG. 3. This means that there are 10 round-robin cycles that include nodes 102b-d and exclude node 102a. The load balancer 208 can multiply the weight increment by the total number of nodes to determine that a second range of keys is to span: (10 weight increment)×(3 nodes)=30 keys. This number of keys can correspond to the number of loads that will only be transmitted to the three nodes 102b-d across the next 10 round-robin cycles. Based on the index value starting at zero, the load balancer 208 can determine that the second range of keys is to span from 60-89. The load balancer 208 can also assign an offset of one to the second range of keys. A similar process can be performed for node 102c to determine a third range of keys that spans 0 keys and has an offset of two. A fourth range of keys corresponding to node 102d can span 10 keys and can have an offset of three. This number of keys can correspond to the number of loads that will be transmitted to only node 102d across the final 10 round-robin cycles. Based on the index value starting at zero, the load balancer 208 can determine that the fourth range of keys is to span from 90-99. It will be appreciated that although the index value and offset value began at zero in the above example, other indexing schemes are possible, such as an indexing scheme starting at one.

Figure 4:
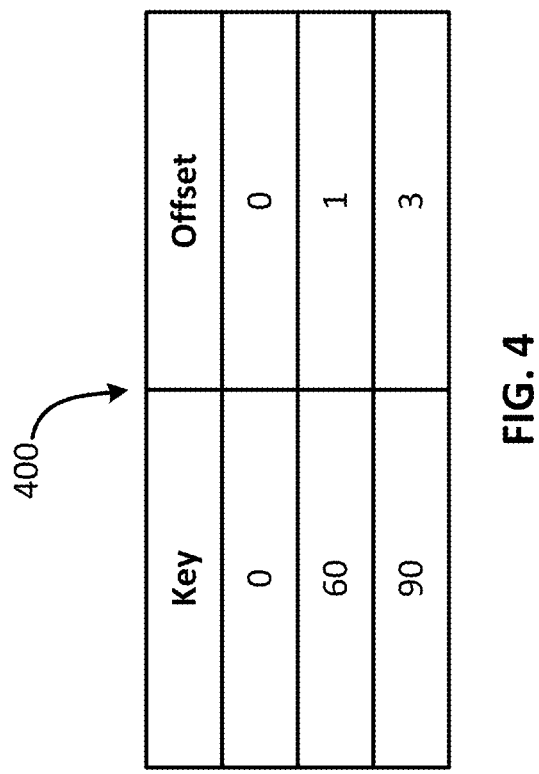
FIG. 4 shows a table including an example of keys mapped to offsets according to some aspects of the present disclosure.

Using the set of key ranges and corresponding offsets, the load balancer 108 can generate a mapping 116 of keys to offsets. One example of the mapping 400 is shown in FIG. 4. The key that is used for each row of the mapping may correspond to the lower boundary of a key range described above. For example, the mapping 400 includes the key of zero from the first key range of 0-59. The mapping 400 includes the key of 60 from the second key range of 60-89. And the mapping 400 includes the key of 90 from the fourth key range of 90-99. Because the third range of values spans zero keys, it can be excluded from the mapping 116 to conserve memory space.

Figure 5:
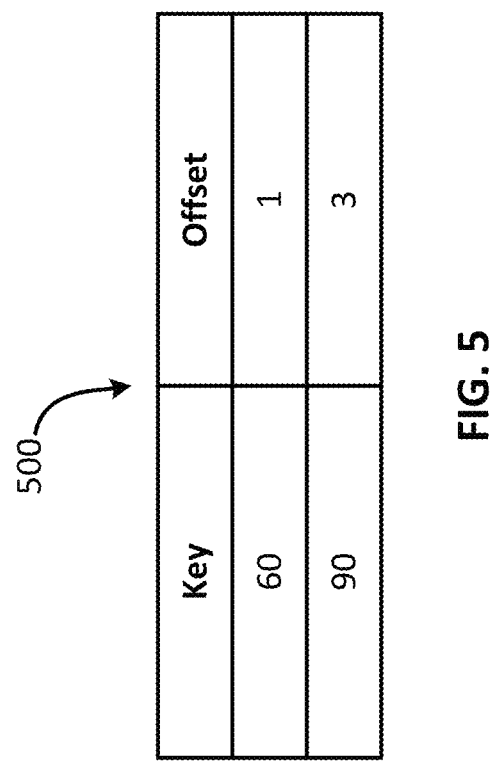
FIG. 5 shows a table including another example of keys mapped to offsets according to some aspects of the present disclosure.

In some examples, the load balancer 108 may exclude (e.g., remove) the first row from the mapping 116, because it can be inferred that any key value that is less than 60 will correspond to a key range from 0-59 and an offset of zero. An example of the mapping 500 that excludes the first row is shown in FIG. 5. Excluding the first row from the mapping can conserve additional memory space. The memory savings may be significant if there a large number of such mappings, for example to accommodate many load-balancing strategies.

Having obtained the list of node identifiers 110 and the mapping 116, the load balancer 108 can use them to implement a load-balancing process as follows. The load balancer can begin by initializing a counter value 124 of a counter 122 to zero. The load balancer 108 can then receive a load 120 for delivery to one of the nodes 102a-d. Examples of the load 120 can include a task, message, or other data. The load balancer 108 can access the mapping 116 to determine which of the keys therein has the highest value that is less than or equal to the counter value 124 (e.g., zero). In the exemplary mapping 400 of FIG. 4, the key in the first row has the highest value that is less than or equal to the counter value 124 of zero. That key is zero. So, the load balancer 108 can select the key of zero. And because the key of zero corresponds to an offset value of zero in the mapping 116, the load balancer 108 can select the offset of zero.

Next, the load balancer 108 can determine a subset of node identifiers from the list of node identifiers 110 based on the offset. The subset of node identifiers can contain all of the node identifiers that are present in the list of node identifiers 110 between a lower index position and an upper index position, where the lower index position may correspond to the offset and the upper index position may correspond to the end of the list. Because the list of node identifiers 110 is {a, b, c, d} and the offset is zero, the lower index position can correspond to {a} and the upper index position can correspond to {d}, thereby producing a subset of node identifiers that is {a, b, c, d}. Thus, the subset of node identifiers is equivalent to the list of node identifiers 110. In an alternative example in which the offset is non-zero, the subset of node identifiers can be a proper subset that contains fewer than all of the node identifiers in the list of node identifiers 110.

Having determining the subset of node identifiers, the load balancer 108 can next determine a target index position in the subset of node identifiers. The load balancer 108 can determine the target index position based on the counter value 124, the number of node identifiers in the subset, or both. For example, the load balancer 108 can divide the counter value by number of node identifiers in the subset to determine a remainder value, which can correspond to the target index position in the subset. As one such example, the load balancer 108 can calculate (counter value) mod (number of node identifiers), where mod is a modulus function, to determine a remainder value. Applying these principles to the above example in which the counter value is zero and the number of node identifiers is four, the remainder value can be zero. So, the load balancer 108 can determine that the target index position in the subset of node identifiers is position zero. The load balancer 108 can select whichever node identifier is located at position zero in the subset of node identifiers, determine the node identifier corresponds to a particular node in the distributed computing system 100, and forward the load 120 to that particular node 102a. The load balancer 108 may then increment the counter value 124 and repeat the above process for the next load.

Figure 6:
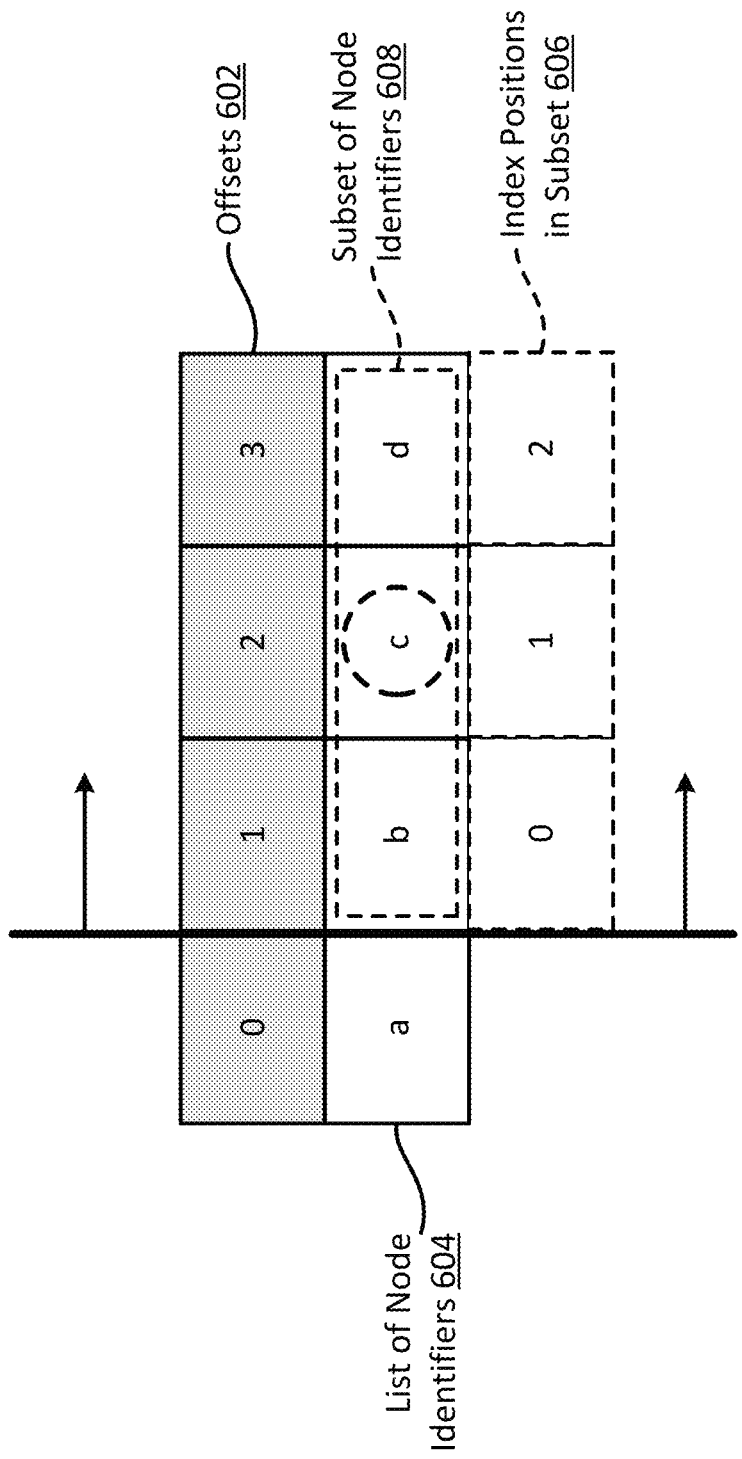
FIG. 6 shows an example of a process for selecting a node using an offset according to some aspects of the present disclosure.

A more complex example of the above process is shown in FIG. 6. For ease of explanation, the offsets 602, the list of node identifiers 604, the subset of node identifiers 608, and index positions 606 (in the subset of node identifiers) are shown in FIG. 6. In this example, the counter value can be 61. The load balancer 108 can identify the key of 60 from the mapping (e.g., mapping 500 of FIG. 5), because the number 60 is the greatest key value in the mapping that is less than or equal to the counter value of 61. Based on this key, the load balancer 108 can select the offset in the mapping that corresponds to the key value of 60. The selected offset can have a value of one. The load balancer 108 can apply that offset to the list of node identifiers 604, as represented by the vertical line with two right-facing arrows in FIG. 6, to determine a subset of node identifiers 608 from the list of node identifiers 604. Because the list of node identifiers 604 is {a, b, c, d} and the offset is one, the lower index position can correspond to {b} and the upper index position can correspond to {d}, thereby producing a subset of node identifiers 608 that includes {b, c, d}. Having determined the subset of node identifiers 608, the load balancer 108 can calculate 61 mod 3=1, where 61 is the counter value and 3 is the number of node identifiers in the subset of node identifiers 608. The remainder of 1 can indicate the target index position. Based on the remainder, the load balancer 108 select the node identifier at index position 1 in the subset of node identifiers 608, which is node identifier "c" as shown in a dashed circle. The load balancer 108 can then determine that node 102c corresponds to node identifier "c" in the distributed computing environment 100 and transmit a load to node 102c.

The load balancer 108 can repeat the above process, incrementing the counter value 124 for each load, until the counter value 124 reaches a maximum value. The maximum value can be the sum of the weights in the list of weights 112 minus one. For example, if the list of weights 112 is {15, 25, 25, 35}, the maximum value can be 15+25+25+35−1=99. Reaching the maximum counter value may signify that the load balancer 108 has completed a single iteration of the load-balancing process. So, the load balancer 108 may then reset the counter value 124 to zero and begin the next iteration of the load-balancing process. Any number of such iterations may be performed by the load balancer 108.

While the above description involves the load balancer 108 performing various steps (e.g., receiving the list of weights 112, generating the list of weight increments 114, generating the mapping 116, etc.), this is intended to be illustrative and non-limiting. In other examples, one or more of the above steps may be implemented by one or more other components that are internal or external to the distributed computing system 100. For example, a node 102a of the distributed computing system 100 could generate and provide the list of node identifiers 110 and the mapping 116 to the load balancer 108 for use in the load-balancing process.

It will also be appreciated that although FIG. 1 depicts a certain number and arrangement of components, other examples may include more components, fewer components, different components, or a different number of the components that is shown in FIG. 1. For instance, the distributed computing system 100 can include more or fewer nodes than are shown in FIG. 1. Additionally, some or all of the components (e.g., the list of node identifiers 110, the list of weights 112, list of weight increments 114, the counter 122, and the mapping 116) depicted as being internal to the load balancer 108 may be positioned in other locations that are internal or external to the distributed computing system 100. For example, the counter 122, the mapping 116, and the list of node identifiers 110 can be stored in a remote data store 118 that is accessible to the load balancer 108. And although various features are described herein as "lists", it will be appreciated that a "list" can refer to any ordered set of elements stored in any suitable data structure (e.g., an array or lookup table).

Figure 7:
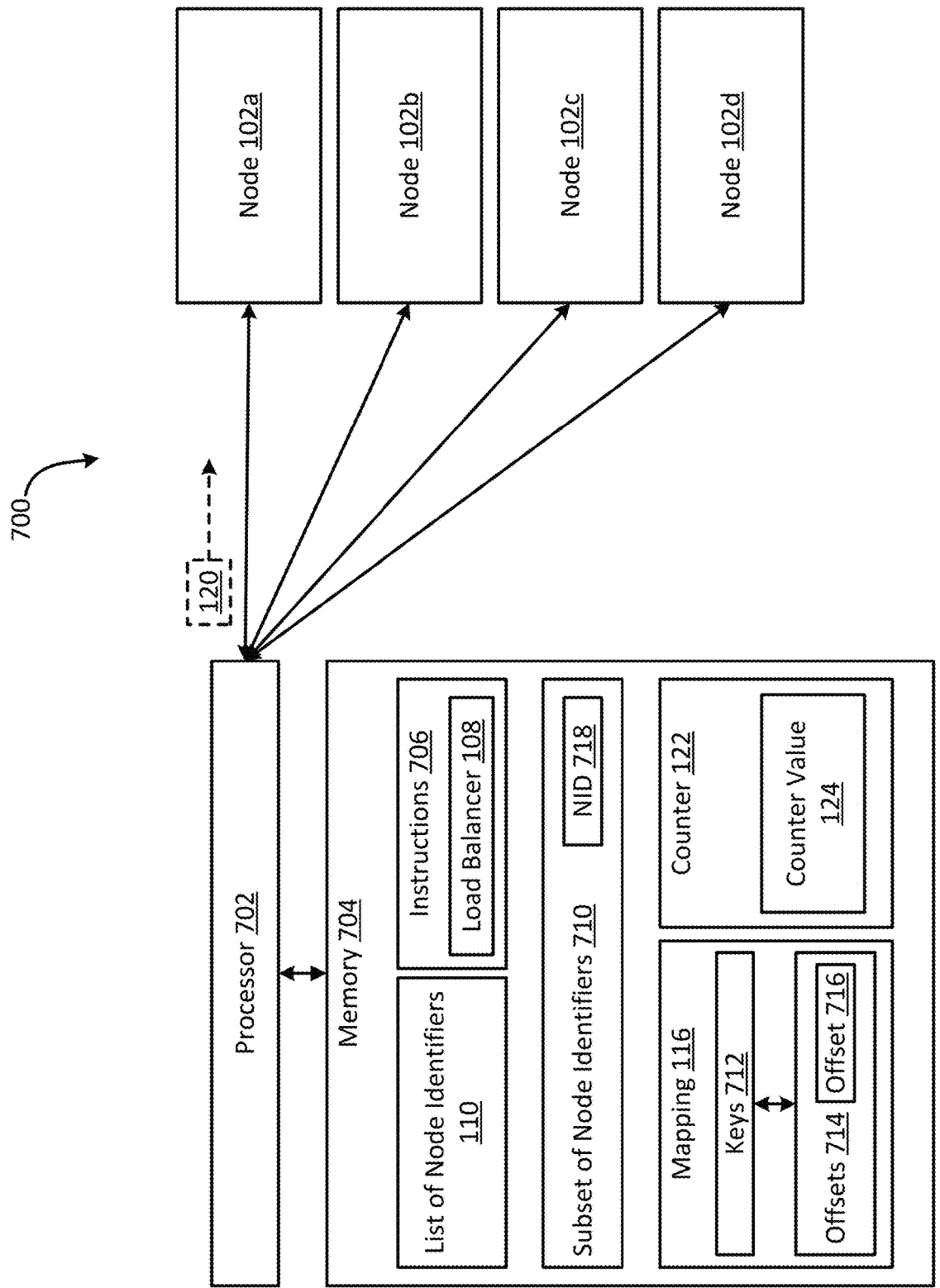
FIG. 7 shows a block diagram of an example of a system for implementing a memory-efficient technique for round-robin load balancing according to some aspects of the present disclosure.

Another example of a system for implementing a memory-efficient technique for round-robin load balancing is shown in FIG. 7. The system 700 can be a distributed computing environment, in some examples. The system 700 includes a processor 702 that is communicatively coupled to a memory 704 and a group of nodes 102a-d. In some examples, the processor 702 and the memory 704 can be part of the same computing device. In other examples, the processor 702 and the memory 704 can be distributed from (e.g., remote to) one another.

The processor 702 can include one processor or multiple processors. Non-limiting examples of the processor 702 include a Field-Programmable Gate Array (FPGA), an application-specific integrated circuit (ASIC), or a microprocessor. The processor 702 can execute instructions 706 stored in the memory 704 to perform operations. The instructions 706 may include processor-specific instructions generated by a compiler or an interpreter from code written in any suitable computer-programming language, such as C, C++, C#, Java, or Python. In some examples, the instructions 706 can correspond to the load balancer 108 of FIG. 1.

The memory 704 can include one memory or multiple memories. The memory 704 can be volatile or non-volatile. Non-volatile memory includes any type of memory that retains stored information when powered off. Examples of the memory 704 include electrically erasable and programmable read-only memory (EEPROM) or flash memory. At least some of the memory 704 can include a non-transitory computer-readable medium from which the processor 702 can read instructions 706. A non-transitory computer-readable medium can include electronic, optical, magnetic, or other storage devices capable of providing the processor 702 with computer-readable instructions or other program code. Examples of a non-transitory computer-readable medium can include a magnetic disk, a memory chip, ROM, random-access memory (RAM), an ASIC, a configured processor, and optical storage.

The processor 702 can execute the instructions 706 to perform operations. For example, the processor 702 can select an offset 716 from a mapping 116 of keys 712 to offsets 714. The processor 702 can select the offset 716 by comparing a counter value 124 of a counter 122 to the keys 712 in the mapping 116. For example, the processor 702 can compare the counter value 124 to the keys 712 to determine which particular key has the highest value that is less than or equal to the counter value 124, at which point the processor 702 can select the offset that corresponds to that particular key in the mapping 116. Next, the processor 702 can select a subset of node identifiers 710 from a list of node identifiers 110 based on the offset 714. Having selected the subset of node identifiers 710, the processor 702 can select a node identifier 718 ("NID") from the subset of node identifiers 710. The processor 702 may select the node identifier 718 based on the counter value 124 and a length of the subset of node identifiers 710 (e.g., the total number of elements in the subset of node identifiers 710). The processor 702 can then transmit data 120 (e.g., a load) to a node 102a corresponding to the node identifier 718. The processor 702 can then increment the counter value 124 and repeat the above process for a next load. The processor 702 can repeat this process until a maximum value for the counter 122 has been reached, which may indicate that a current iteration of a load-balancing process is complete. The processor 702 may then reset the counter value 124 to zero and begin a next iteration of the load-balancing process.

Figure 8:
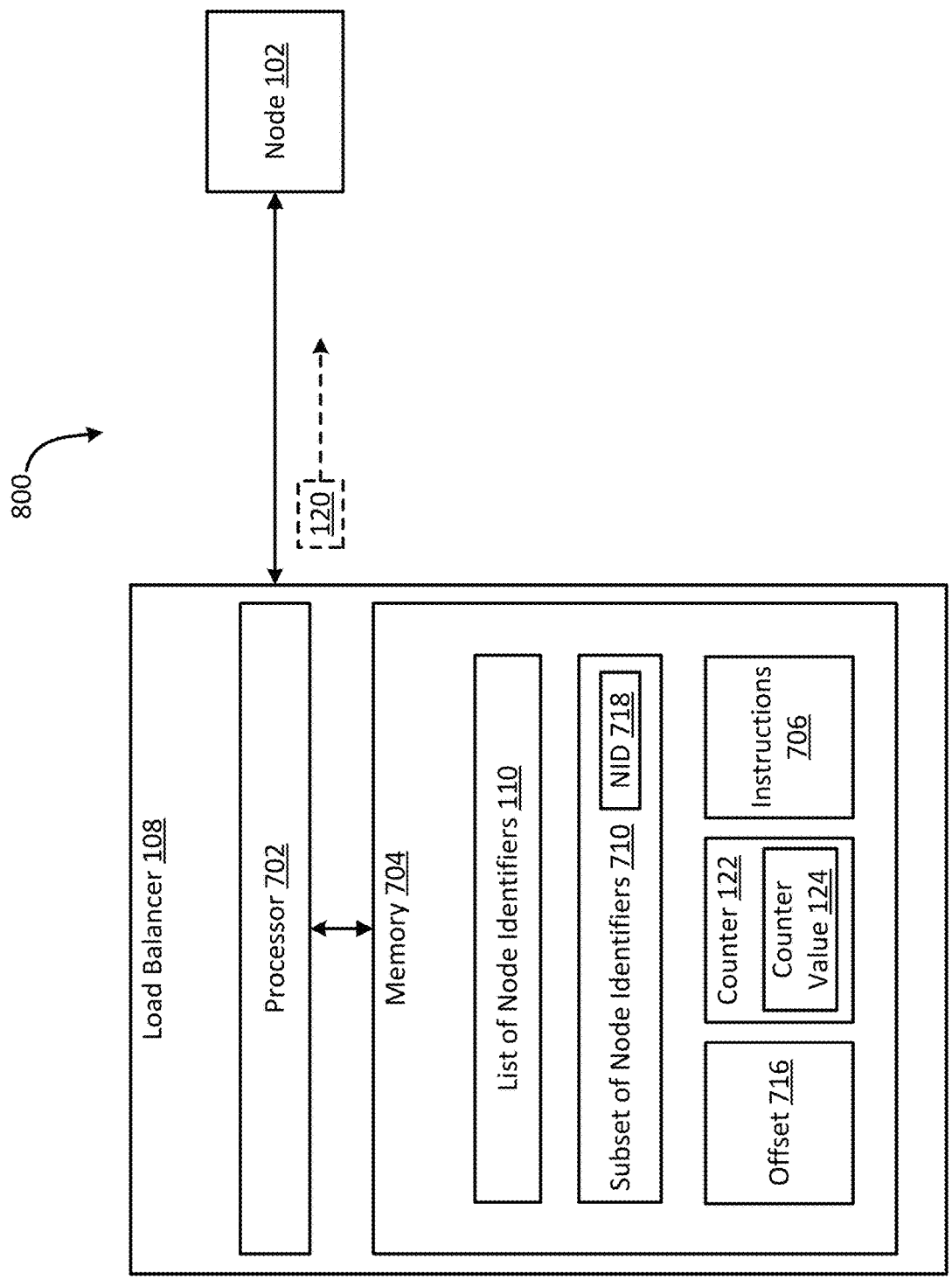
FIG. 8 shows a block diagram of another example of a system for implementing a memory-efficient technique for round-robin load balancing according to some aspects of the present disclosure.

FIG. 8 shows a block diagram of another example of a system 800 for implementing a memory-efficient technique for round-robin load balancing according to some aspects of the present disclosure. The system 800 may be a distributed computing system, in some examples. The system 800 includes a load balancer 108 communicatively coupled to one or more nodes, such as node 102. In this example, the load balancer 108 is a physical machine that includes a processor 702 communicatively coupled to a memory 704. The memory 704 can include a counter 122 with a counter value 124. The processor 702 of the load balancer 108 can execute instructions (e.g., instructions 706 of FIG. 7) stored in memory 704 to perform operations, such as any of the operations described herein.

For example, the load balancer 108 can select an offset 716 to apply to a list of node identifiers 110 based on the counter value 124. The load balancer 108 can then select a subset of node identifiers 710 from the list of node identifiers 110 based on the counter value 124 and a length of the subset of node identifiers 710. Having selected the subset of node identifiers 710, the load balancer 108 can select a node identifier 718 from the subset of node identifiers 710. The load balancer 108 may select the node identifier 718 based on the counter value 124 and a length of the subset of node identifiers 710. The load balancer 108 can then transmit data 120 to the node 102 that corresponds to the node identifier 718.

After transmitting the data 120 to the node 102, the load balancer 108 may increment the counter value 124 and repeat the above process for a next load. The processor 702 can repeat this process until a maximum value for the counter 122 has been reached, which may indicate that a current iteration of a load-balancing process is complete. The processor 702 may then reset the counter value 124 to zero and begin a next iteration of the load-balancing process.

Figure 9:
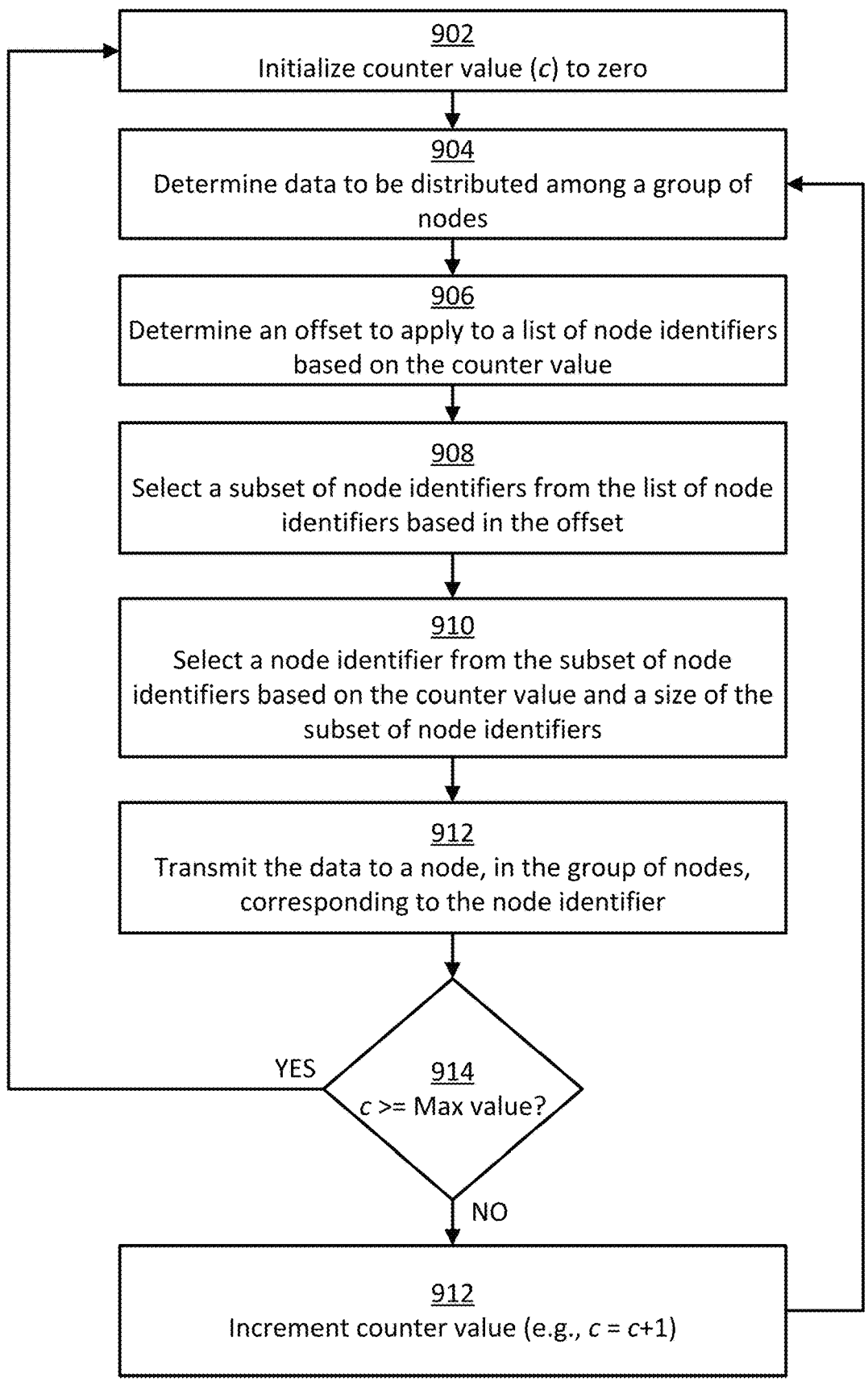
FIG. 9 shows a flow chart of an example of a process for implementing a memory-efficient technique for round-robin load balancing according to some aspects of the present disclosure.

FIG. 9 shows a flow chart of an example of a process for implementing a memory-efficient technique for round-robin load balancing according to some aspects of the present disclosure. Other examples can include more steps, fewer steps, different steps, or a different order of the steps than is shown in FIG. 9. The steps of FIG. 9 are discussed below with reference to the components discussed above in relation to FIGS. 7-8.

In block 902, the processor 702 initializes a counter value 124 to zero.

In block 904, the processor 702 determines data 120 to be distributed among a group of nodes 102a-d.

In block 906, the processor 702 determines an offset 716 to apply to a list of node identifiers 110 based on the counter value 124. For example, the processor 702 can select an offset 716 from a mapping 116 of keys 712 to offsets 714. The processor 702 can select the offset 716 by comparing a counter value 124 to the keys 712 in the mapping 116.

In block 908, the processor 702 selects a subset of node identifiers 710 from a list of node identifiers 110 based on the offset 714. For example, the processor 702 can select, for inclusion in the subset of node identifiers 710, some or all of the node identifiers that are located in the list 110 between a lower index position that corresponds to the offset and an upper index position that corresponds to the end of the list 110.

In block 910, the processor 702 selects a node identifier 718 ("NID") from the subset of node identifiers 710, for example based on the counter value 124 and a length of the subset of node identifiers 710. In some such examples, the processor 702 can select the node identifier 718 based on a remainder of a division calculation in which the counter value 124 is divided by the length of the subset of node identifiers 710.

In block 912, the processor 702 transmits the data 120 to a node 102a corresponding to the node identifier 718. In some examples, the processor 702 may determine which node corresponds to the node identifier by using a lookup table that correlates node identifiers to the nodes 102a-d. In other examples, the node identifier may directly identify the node 102 for the processor 702. Either way, the processor 702 may determine which node 102a corresponds to the node identifier 718 and transmit the data 120 to that node 102a.

In block 914, the processor 702 determines if the current counter value 124 is greater than or equal to a maximum value. The maximum value may correspond to a sum of the weights assigned to the nodes 102a-d, or the sum of the weights minus one, depending on the indexing schemes used (e.g., if indexing begins at one or zero). If the current counter value 124 is greater than or equal to a maximum value, the process can return to block 902 where the processor 702 can reset the counter value 124 to zero. Resetting the counter value 124 to zero may begin a next iteration of the load-balancing technique. Otherwise, the process can proceed to block 912 where the processor 702 can increment the counter value 124 (e.g., by one). The process can then return to block 904 where the processor 702 can await the next load for distribution.

Figure 10:
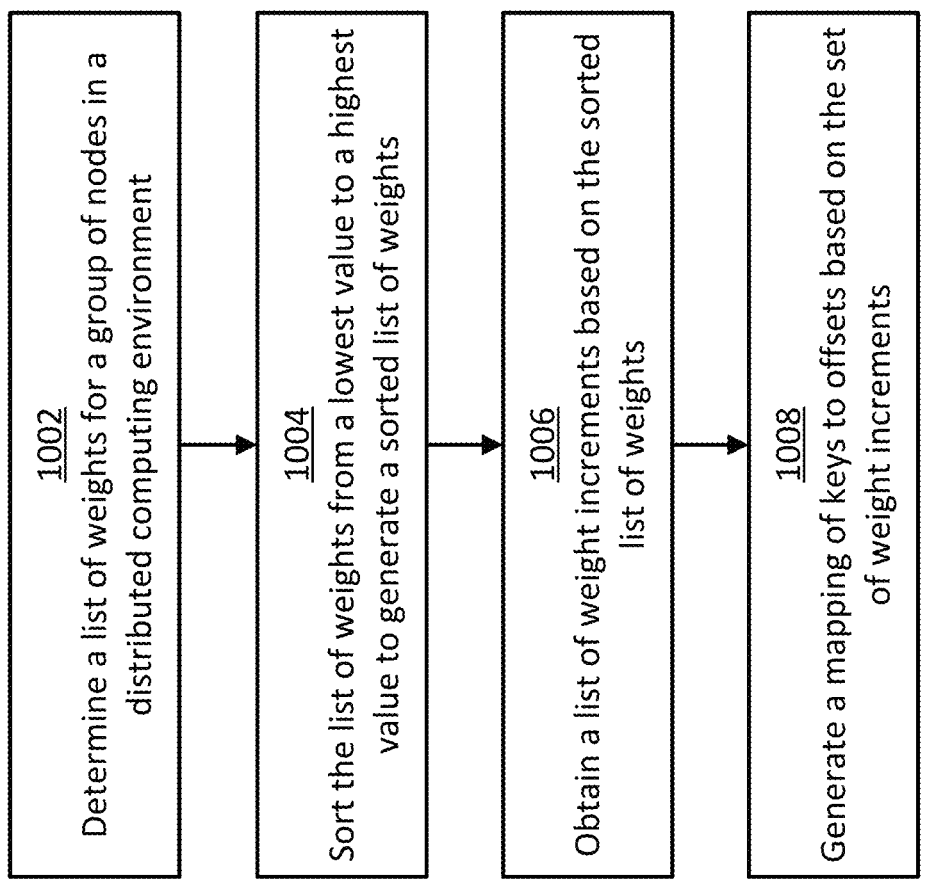
FIG. 10 shows a flow chart of an example of a process for generating a mapping of keys to values according to some aspects of the present disclosure.

To perform the above process, the processor 702 may rely on a mapping 116 of keys 712 to offsets 714. In some examples, the processor 702 can automatically generate the mapping 116. One example of a process for automatically generating the mapping 116 is shown in FIG. 10. But other examples can include more steps, fewer steps, different steps, or a different order of the steps than is shown in FIG. 10. The steps of FIG. 10 are discussed below with reference to the components discussed above in relation to FIGS. 1 and 7.

In block 1002, the processor 702 determines a list of weights 112 for a group of nodes 102a-d in a distributed computing system 100. The weights can be numerical values. The processor 702 can determine the list of weights 112 by communicating with the nodes 102a-d via a network 106, by receiving said weights as user inputs from a user, or in another way.

In block 1004, the processor 702 sorts the list of weights 112 from a lowest value to a highest value to generate a sorted list of weights.

In block 1006, the processor 702 obtains a list of weight increments 114 based on the sorted list of weights. Obtaining the list of weight increments 114 may involve receiving or generating the list of weight increments 114. In some examples, the processor 702 can generate the list of weight increments 114 by performing the process shown in FIG. 11 and described in greater detail later on.

In block 1008, the processor 702 generates a mapping 116 of keys to offsets based on the list of weight increments. For example, the processor 702 can determine a key range and an offset that correspond to a weight increment in the list of weight increments 114. The key range can be a range of keys between a lower key boundary and an upper key boundary. The processor 702 can then incorporate a relationship between the offset and one of the key boundaries (e.g., the lower key boundary or the upper key boundary) into the mapping 116. The processor 702 can repeat this process for some or all of the weight increments in the list of weight increments 114 to generate the mapping 116.

Figure 11:
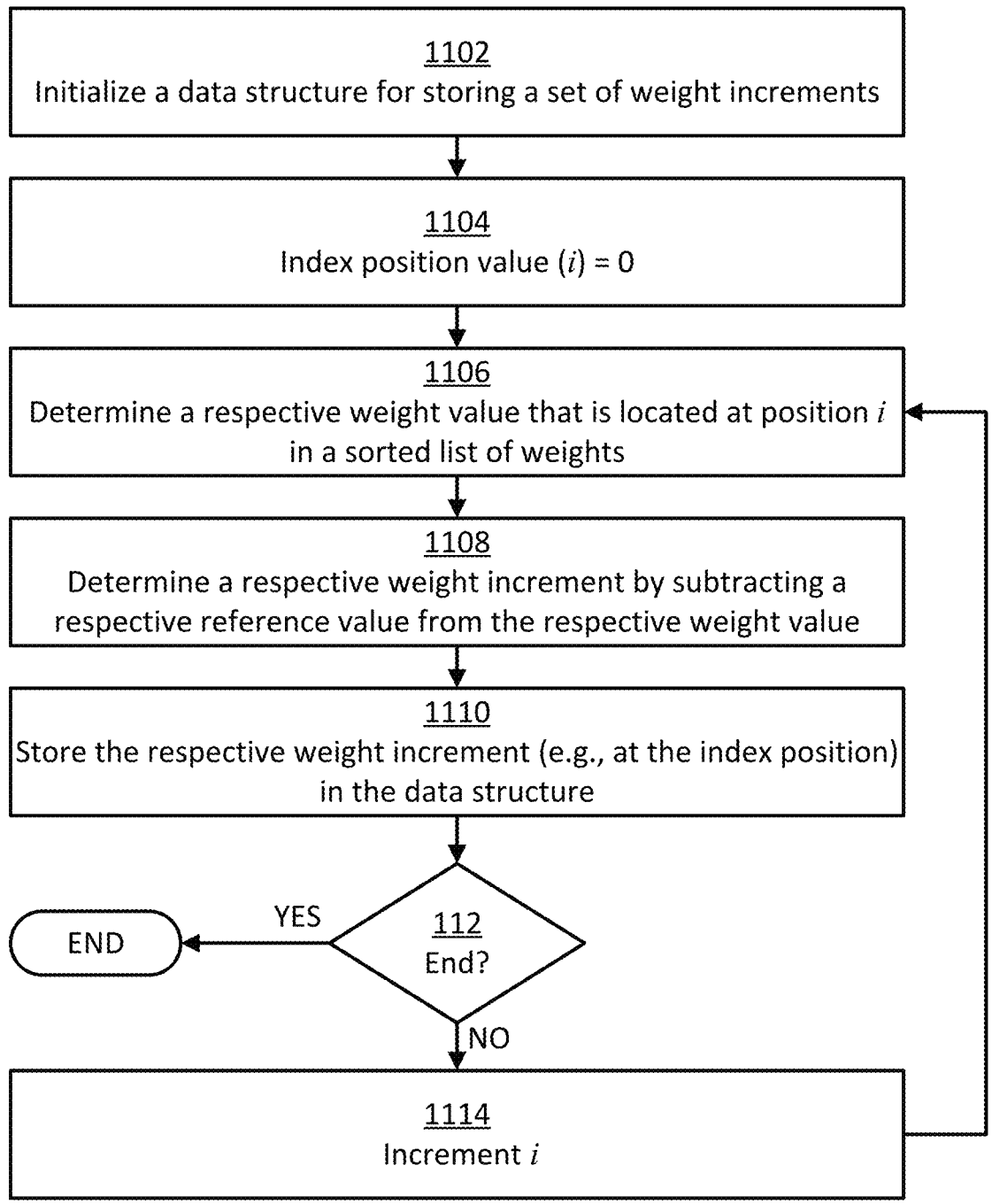
FIG. 11 shows a flow chart of an example of a process for generating a list of weight increments according to some aspects of the present disclosure.

As noted above, the processor 702 can determine a list of weight increments 114 for use in generating the mapping 116. One example of a process for determining a list of weight increments 114 is shown in FIG. 11. But other examples can include more steps, fewer steps, different steps, or a different order of the steps than is shown in FIG. 11. The steps of FIG. 11 are discussed below with reference to the components discussed above in relation to FIGS. 1 and 7.

In block 1102, the processor 702 initializes a data structure (e.g., an array, a data table, etc.) for storing a list of weight increments.

In block 1104, the processor 702 initializes an index position value (i) to zero.

In block 1106, the processor 702 determines a respective weight value that is located at position i in a sorted list of weights 112.

In block 1108, the processor 702 determines a respective weight increment by subtracting a respective reference value from the respective weight value. The respective reference value may be zero or another weight value in the sorted list of weights 112. For example, the respective reference value can be another weight value that is positioned immediately prior to the respective weight value (e.g., at location i−1) in the sorted list of weights 112.

In block 1110, the processor 702 stores the respective weight increment in the data structure. The processor 702 can store the respective weight value at the index position i in the data structure. The data structure can serve as the list of weight increments 1114.

In block 1112, the processor 702 can determine if the process should end. In some examples, the processor 702 can determine that the process should end if the value of i is greater than or equal to the length of the sorted list of weights 112. The length of the sorted list of weights can be the number of elements in the sorted list of weights 112. If the processor 702 determines that the process should not end, then the processor 702 can increment i (e.g., by one) and return to block 1106, so that blocks 1106-114 can repeat. This process can repeat any number of times, for example until the processor 702 determines at block 112 that the process should end.

In some aspects, a memory-efficient technique for weighted round-robin load balancing is provided according to one or more of the following examples. As used below, any reference to a series of examples is to be understood as a reference to each of those examples disjunctively (e.g., "Examples 1-4" is to be understood as "Examples 1, 2, 3, or 4").

Example #1: A non-transitory computer-readable medium comprising program code that is executable by a processor for causing the processor to: determine an offset to apply to a list of node identifiers based on a counter value; select a subset of node identifiers from the list of node identifiers based on the offset; select a node identifier from the subset of node identifiers based on the counter value and a length of the subset of node identifiers; and transmit data to a node corresponding to the node identifier.

Example #2: The non-transitory computer-readable medium of Example #1 may further comprise program code that is executable by the processor for causing the processor to: obtain a mapping that correlates keys to offsets; and select the offset from the mapping by comparing the counter value to the keys.

Example #3: The non-transitory computer-readable medium of Example #2 may further comprise program code that is executable by the processor for causing the processor to generate the mapping based on a plurality of weights, each weight in the plurality of weights being assigned to a respective node of a plurality of nodes in a distributed computing system and dictating an amount of data to be transmitted to the respective node by a load balancer.

Example #4: The non-transitory computer-readable medium of Example #3 may further comprise program code that is executable by the processor for causing the processor to determine each weight in the plurality of weights based on a number of recipients executing on the respective node corresponding to the weight.

Example #5: The non-transitory computer-readable medium of any of Examples #3-4 may further comprise program code that is executable by the processor for causing the processor to: sort the plurality of weights from a lowest value to a highest value to generate a sorted list of weights; obtain a list of weight increments based on the sorted list of weights; and generate the mapping based on the list of weight increments.

Example #6: The non-transitory computer-readable medium of Example #5 may further comprise program code that is executable by the processor for causing the processor to determine the list of weight increments by: initializing a data structure for storing the list of weight increments; and for each index position of a plurality of index positions in the sorted list of weights: determining a respective weight value that is located at the index position in the sorted list of weights; determining a respective weight increment by subtracting a respective reference value from the respective weight value, wherein the respective reference value is zero or a particular weight value in the sorted list of weights; and storing the respective weight increment in the data structure, wherein the data structure serves as the list of weight increments.

Example #7: The non-transitory computer-readable medium of any of Examples #5-6 may further comprise program code that is executable by the processor for causing the processor to generate the mapping based on the list of weight increments by, for each weight increment in the list of weight increments: determining a respective key range based on the weight increment; determining a respective offset corresponding to the respective key range; and storing a relationship between the respective key range and the respective offset in the mapping.

Example #8: The non-transitory computer-readable medium of any of Examples #1-7 may further comprise program code that is executable by the processor for causing the processor to select the node identifier from the subset of node identifiers by: dividing the counter value by the length of the subset of node identifiers to obtain a remainder; and selecting the node identifier from the subset of node identifiers based on the remainder.

Example #9: The non-transitory computer-readable medium of any of Examples #1-8 may further involve the program code forming at least part of a load balancer for a distributed computing system.

Example #10: The non-transitory computer-readable medium of any of Examples #1-9 may further involve the subset of node identifiers being a proper subset of the list of node identifiers.

Example #11: A distributed computing system comprising a processor; a list of node identifiers that uniquely identify a plurality of nodes in the distributed computing system; a mapping of keys to offsets, wherein the keys correspond to counter values and the offsets correspond to index positions characterizing locations of elements in the list of node identifiers; a counter indicating a counter value; and a memory including instructions for a load balancer, the instructions being executable by the processor for causing the processor to implement a load-balancing process. The load-balancing process can involve determining an offset to apply to the list of node identifiers by comparing the counter value to the keys in the mapping; selecting a subset of node identifiers from the list of node identifiers based on the offset; selecting a node identifier from the subset of node identifiers based on the counter value and a length of the subset of node identifiers; and transmitting data to a node, of the plurality of nodes, corresponding to the node identifier.

Example #12: The distributed computing system of Example #11, wherein the instructions are further executable by the processor to generate the mapping based on a plurality of weights, each weight in the plurality of weights being assigned to a respective node of the plurality of nodes in the distributed computing system based on a number of recipients executing on the respective node.

Example #13: The distributed computing system of Example #12, wherein the instructions are further executable by the processor to: sort the plurality of weights from a lowest value to a highest value to generate a sorted list of weights; obtain a list of weight increments based on the sorted list of weights; and generate the mapping based on the list of weight increments.

Example #14: The distributed computing system of Example #13, wherein the instructions are further executable by the processor to determine the list of weight increments by: initializing a data structure for storing the list of weight increments; for each index position of a plurality of index positions in the sorted list of weights: determining a respective weight value that is located at the index position in the sorted list of weights; determining a respective weight increment by subtracting a respective reference value from the respective weight value, wherein the respective reference value is zero or a particular weight value located at a prior index position in the sorted list of weights; and storing the respective weight increment at the index position in the data structure, wherein the data structure serves as the list of weight increments.

Example #15: A method including determining an offset to apply to a list of node identifiers based on a counter value; selecting a subset of node identifiers from the list of node identifiers based in the offset; selecting a node identifier from the subset of node identifiers based on the counter value and a length of the subset of node identifiers; and transmitting data to a node corresponding to the node identifier. Some or all of the method steps can be implemented by a processor.

Example #16: The method of Example #15 may further comprise generating a mapping of keys to offsets based on a plurality of weights, each weight in the plurality of weights being assigned to a respective node of a plurality of nodes in a distributed computing system based on a number of recipients executing on the respective node; and selecting the offset from the mapping by comparing the counter value to the keys in the mapping.

Example #17: The method of Example #16 may further comprise sorting the plurality of weights from a lowest value to a highest value to generate a sorted list of weights; determining a list of weight increments based on the sorted list of weights; and generating the mapping based on the list of weight increments.

Example 18: The method of Example #17 may further comprise determining the list of weight increments by: initializing a data structure for storing the list of weight increments; and for each index position of a plurality of index positions in the sorted list of weights: determining a respective weight value that is located at the index position in the sorted list of weights; determining a respective weight increment by subtracting a respective reference value from the respective weight value, wherein the respective reference value is zero or a particular weight value in the sorted list of weights; and storing the respective weight increment in the data structure, wherein the data structure serves as the list of weight increments.

Example #19: The method of any of Examples #17-18 may further comprise generating the mapping based on the list of weight increments by, for each weight increment in the list of weight increments: determining a respective key range based on the weight increment; determining a respective offset corresponding to the respective key range; and storing a relationship between the respective key range and the respective offset in the mapping.

Example #20: The method of any of Examples #15-19 may further comprise selecting the node identifier from the subset of node identifiers by: dividing the counter value by the length of the subset of node identifiers to obtain a remainder; and selecting the node identifier from the subset of node identifiers based on the remainder.

Example #21: A system comprising storage means for storing a list of node identifiers that uniquely identify a plurality of nodes in a distributed computing system; storage means for storing a mapping of keys to offsets; and processing means for performing computer operations. The computer operations can include: determining an offset to apply to the list of node identifiers by comparing a counter value to the keys in the mapping; selecting a subset of node identifiers from the list of node identifiers based on the offset; selecting a node identifier from the subset of node identifiers based on the counter value and a length of the subset of node identifiers; and transmitting data to a node corresponding to the node identifier.

Example #22: The system of Example #21, wherein the data is a message transmitted from another node in the distributed computing system.

Example #23: The system of any of Examples #21-22, wherein the processing means is configured to generate the mapping based on a plurality of weights, each weight in the plurality of weights being assigned to a respective node of the plurality of nodes in the distributed computing system based on a number of recipients executing on the respective node.

Example #24: The system of Example #23, wherein the processing means is configured to: sort the plurality of weights from a lowest value to a highest value to generate a sorted list of weights; obtain a list of weight increments based on the sorted list of weights; and generate the mapping based on the list of weight increments.

Example #25: The system of Example #24, wherein the processing means is configured to determine the list of weight increments by: initializing a data structure for storing the list of weight increments; and for each index position of a plurality of index positions in the sorted list of weights: determining a respective weight value that is located at the index position in the sorted list of weights; determining a respective weight increment by subtracting a respective reference value from the respective weight value, wherein the respective reference value is zero or a particular weight value in the sorted list of weights; and storing the respective weight increment in the data structure, wherein the data structure serves as the list of weight increments.

Example #26: The system of any of Examples #24-25, wherein the processing means is configured to generate the mapping based on the list of weight increments by, for each weight increment in the list of weight increments: determining a respective key range based on the weight increment; determining a respective offset corresponding to the respective key range; and storing a relationship between the respective key range and the respective offset in the mapping.

Example #27: The system of any of Examples #21-26, wherein the processing means is configured to select the node identifier from the subset of node identifiers by: dividing the counter value by the length of the subset of node identifiers to obtain a remainder; and selecting the node identifier from the subset of node identifiers based on the remainder.

Example #28: The system of any of Examples #21-27, wherein the keys correspond to counter values, and wherein the offsets correspond to index positions characterizing locations of elements in the list of node identifiers, the offsets being usable for selecting the subset of node identifiers from the list of node identifiers.

Example #29: The system of any of Examples #21-28, wherein the subset of node identifiers is a proper subset of the list of node identifiers.

Example #30: A non-transitory computer-readable medium comprising: a data structure including node identifiers that uniquely identify a plurality of nodes in a distributed computing system; and a mapping of a plurality of keys to a plurality of offsets, the plurality of keys corresponding to counter values and the plurality of offsets corresponding to index positions characterizing locations of elements in the data structure, the mapping being usable by a load balancer for selecting an offset of the plurality of offsets corresponding to a key of the plurality of keys based on a counter value, the offset being usable by the load balancer for determining a subset of the node identifiers from which a particular node identifier is to be selected based on the counter value so as to identify a corresponding node of the plurality of nodes as a recipient for a data transmission.

Example #31: The non-transitory computer-readable medium of Example #30 may further comprise program code for the load balancer, the program code being executable by a processor for causing the processor to: select the key from the mapping based on the counter value; based on selecting the key, determine that the key corresponds to the offset in the mapping; based on determining that the key corresponds to the offset in the mapping, select the subset of the node identifiers based on the offset; based on selecting the subset of the node identifiers, select the particular node identifier from the subset based on the counter value; and based on selecting the particular node identifier from the subset, transmit data to the corresponding node of the plurality of nodes.

Example #32: The non-transitory computer-readable medium of any of Examples #30-31 may further comprise program code that is executable by the processor to generate the mapping based on a plurality of weights, each weight in the plurality of weights being assigned to a respective node of the plurality of nodes in the distributed computing system based on a number of recipients executing on the respective node.

Example #33: The non-transitory computer-readable medium of Example #32 may further comprise program code that is executable by the processor to: sort the plurality of weights from a lowest value to a highest value to generate a sorted list of weights; obtain a list of weight increments based on the sorted list of weights; and generate the mapping based on the list of weight increments.

Example #34: The non-transitory computer-readable medium of Example #33 may further comprise program code that is executable by the processor to determine the list of weight increments by: initializing an array for storing the list of weight increments; and for each index position of a plurality of index positions in the sorted list of weights: determining a respective weight value that is located at the index position in the sorted list of weights; determining a respective weight increment by subtracting a respective reference value from the respective weight value, wherein the respective reference value is zero or a particular weight value in the sorted list of weights; and storing the respective weight increment at the index position in the array, wherein the array serves as the list of weight increments.

Example #35: The non-transitory computer-readable medium of any of Examples #33-34 may further comprise program code that is executable by the processor for causing the processor to generate the mapping based on the list of weight increments by, for each weight increment in the list of weight increments: determining a respective key range based on the weight increment; determining a respective offset corresponding to the respective key range; and storing a relationship between the respective key range and the respective offset in the mapping.

Example #36: A load balancer comprising a processor and a memory. The memory can include a counter indicating a counter value. The memory can also include instructions that are executable by the processor for causing the processor to: determine an offset to apply to a list of node identifiers based on the counter value; select a subset of node identifiers from the list of node identifiers based on the offset; select a node identifier from the subset of node identifiers based on the counter value and a length of the subset of node identifiers; transmit data to a node corresponding to the node identifier; and increment the counter value.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A non-transitory computer-readable medium comprising program code that is executable by a processor for causing the processor to:
   determine an offset to apply to a list of node identifiers based on a counter value, wherein the node identifiers uniquely identify a plurality of computing nodes in a distributed computing system;
   select a subset of node identifiers, from the list of node identifiers, based on the offset;
   determine a length of the subset of node identifiers, the length being a number of node identifiers in the subset;
   select a node identifier, from the subset of node identifiers, based on the counter value and the length of the subset of node identifiers; and
   transmit data to a node corresponding to the node identifier.

2. The non-transitory computer-readable medium of claim 1, further comprising program code that is executable by the processor for causing the processor to:
   obtain a mapping that correlates keys to offsets; and
   select the offset from the mapping by comparing the counter value to the keys.

3. The non-transitory computer-readable medium of claim 2, further comprising program code that is executable by the processor for causing the processor to generate the mapping based on a plurality of weights, each weight in the plurality of weights being assigned to a respective node of plurality of computing nodes in the distributed computing system and dictating an amount of data to be transmitted to the respective node by a load balancer.

4. The non-transitory computer-readable medium of claim 3, further comprising program code that is executable by the processor for causing the processor to determine each weight in the plurality of weights based on a number of recipients executing on the respective node corresponding to the weight.

5. The non-transitory computer-readable medium of claim 3, further comprising program code that is executable by the processor for causing the processor to:
   sort the plurality of weights from a lowest value to a highest value to generate a sorted list of weights;
   obtain a list of weight increments based on the sorted list of weights; and
   generate the mapping based on the list of weight increments.

6. The non-transitory computer-readable medium of claim 5, further comprising program code that is executable by the processor for causing the processor to determine the list of weight increments by:
  initializing a data structure for storing the list of weight increments; and
  for each index position of a plurality of index positions in the sorted list of weights:
    determining a respective weight value that is located at the index position in the sorted list of weights;
    determining a respective weight increment by subtracting a respective reference value from the respective weight value, wherein the respective reference value is zero or a particular weight value in the sorted list of weights; and
    storing the respective weight increment in the data structure, wherein the data structure serves as the list of weight increments.

7. The non-transitory computer-readable medium of claim 5, further comprising program code that is executable by the processor for causing the processor to generate the mapping based on the list of weight increments by, for each weight increment in the list of weight increments:
  determining a respective key range based on the weight increment;
  determining a respective offset corresponding to the respective key range; and
  storing a relationship between the respective key range and the respective offset in the mapping.

8. The non-transitory computer-readable medium of claim 1, further comprising program code that is executable by the processor for causing the processor to select the node identifier from the subset of node identifiers by:
  dividing the counter value by the length of the subset of node identifiers to obtain a remainder; and
  selecting the node identifier from the subset of node identifiers based on the remainder.

9. The non-transitory computer-readable medium of claim 1, wherein the program code forms at least part of a load balancer for the distributed computing system.

10. The non-transitory computer-readable medium of claim 1, wherein the subset of node identifiers is a proper subset of the list of node identifiers.

11. A distributed computing system, comprising:
  a processor;
  a list of node identifiers that uniquely identify a plurality of computing nodes in the distributed computing system;
  a mapping of keys to offsets, wherein the keys are counter values, and wherein the offsets are index positions in the list of node identifiers;
  a counter indicating a counter value; and
  a memory including instructions for a load balancer, the instructions being executable by the processor for causing the processor to implement a load-balancing process involving:
    determining a key that matches the counter value in the mapping;
    determining an offset corresponding to the key in the mapping;
    selecting a subset of node identifiers, from the list of node identifiers, based on the offset;
    determining a length of the subset of node identifiers, the length being a number of node identifiers in the subset;
    selecting a node identifier, from the subset of node identifiers, based on the counter value and the length of the subset of node identifiers; and
    transmitting data to a node, of the plurality of computing nodes, corresponding to the node identifier.

12. The distributed computing system of claim 11, wherein the instructions are further executable by the processor to generate the mapping based on a plurality of weights, each weight in the plurality of weights being assigned to a respective node of the plurality of computing nodes in the distributed computing system based on a number of recipients executing on the respective node.

13. The distributed computing system of claim 12, wherein the instructions are further executable by the processor to:
  sort the plurality of weights from a lowest value to a highest value to generate a sorted list of weights;
  obtain a list of weight increments based on the sorted list of weights; and
  generate the mapping based on the list of weight increments.

14. The distributed computing system of claim 13, wherein the instructions are further executable by the processor to determine the list of weight increments by:
  initializing a data structure for storing the list of weight increments;
  for each index position of a plurality of index positions in the sorted list of weights:
    determining a respective weight value that is located at the index position in the sorted list of weights;
    determining a respective weight increment by subtracting a respective reference value from the respective weight value, wherein the respective reference value is zero or a particular weight value located at a prior index position in the sorted list of weights; and
    storing the respective weight increment at the index position in the data structure, wherein the data structure serves as the list of weight increments.

15. A method comprising:
  determining, by a processor, an offset to apply to a list of node identifiers based on a counter value, wherein the node identifiers uniquely identify a plurality of computing nodes in a distributed computing system;
  selecting, by the processor, a subset of node identifiers from the list of node identifiers based in the offset;
  determining, by the processor, a length of the subset of node identifiers, the length being a number of node identifiers in the subset;
  selecting, by the processor, a node identifier from the subset of node identifiers based on the counter value and the length of the subset of node identifiers; and
  transmitting, by the processor, data to a node corresponding to the node identifier.

16. The method of claim 15, further comprising:
  generating a mapping of keys to offsets based on a plurality of weights, each weight in the plurality of weights being assigned to a respective node of the plurality of computing nodes in the distributed computing system based on a number of recipients executing on the respective node; and
  selecting the offset from the mapping by comparing the counter value to the keys in the mapping.

17. The method of claim 16, further comprising:
  sorting the plurality of weights from a lowest value to a highest value to generate a sorted list of weights;
  determining a list of weight increments based on the sorted list of weights; and generating the mapping based on the list of weight increments.

18. The method of claim 17, further comprising determining the list of weight increments by:
  initializing a data structure for storing the list of weight increments; and
  for each index position of a plurality of index positions in the sorted list of weights:
    determining a respective weight value that is located at the index position in the sorted list of weights;
    determining a respective weight increment by subtracting a respective reference value from the respective weight value, wherein the respective reference value is zero or a particular weight value in the sorted list of weights; and
    storing the respective weight increment in the data structure, wherein the data structure serves as the list of weight increments.

19. The method of claim 17, further comprising generating the mapping based on the list of weight increments by, for each weight increment in the list of weight increments:
  determining a respective key range based on the weight increment;
  determining a respective offset corresponding to the respective key range; and
  storing a relationship between the respective key range and the respective offset in the mapping.

20. The method of claim 15, further comprising selecting the node identifier from the subset of node identifiers by:
  dividing the counter value by the length of the subset of node identifiers to obtain a remainder; and
  selecting the node identifier from the subset of node identifiers based on the remainder.

* * * * *